Figure 1:
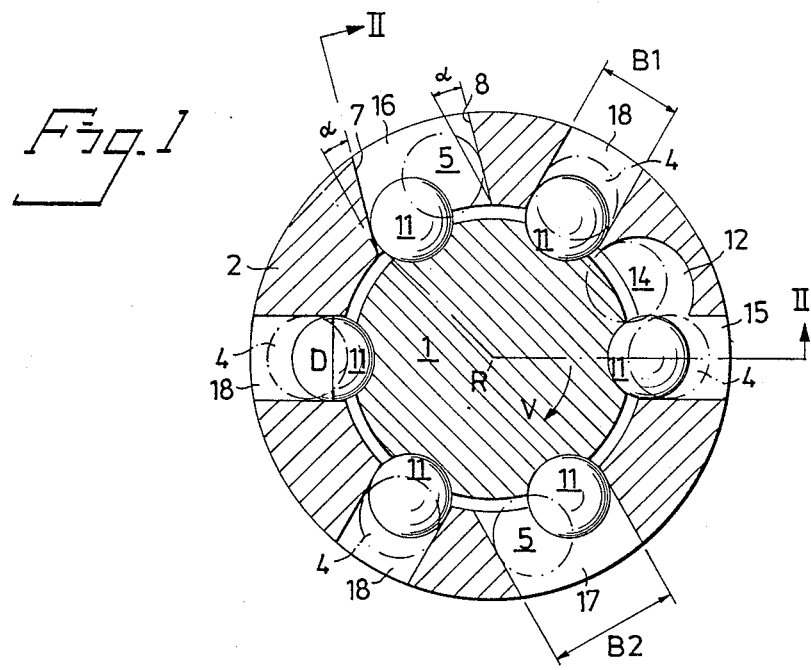

United States Patent [19]

Stenmark et al.

[11] Patent Number: 4,901,836
[45] Date of Patent: Feb. 20, 1990

[54] SETTABLE SLIP CLUTCH

[75] Inventors: Dag Stenmark; Sören Gudmundssom, both of Ödsmål, Sweden

[73] Assignee: S & L Maskin AB, Stenungsund, Sweden

[21] Appl. No.: 91,649

[22] Filed: Sep. 1, 1987

[30] Foreign Application Priority Data

Sep. 10, 1986 [SE] Sweden .............................. 8603796

[51] Int. Cl.⁴ .............................................. F16D 7/06
[52] U.S. Cl. ................................... 192/56 R; 464/36; 403/328
[58] Field of Search ............... 192/56 R; 464/35, 36, 464/38; 403/328, 327, 105, 111, 377, 321

[56] References Cited

U.S. PATENT DOCUMENTS

| | | | |
|---|---|---|---|
| 2,677,562 | 5/1954 | Coffman et al. | 403/328 |
| 3,187,438 | 6/1965 | Esch | 403/321 X |
| 4,041,729 | 8/1977 | Bilz | 192/56 R X |
| 4,263,996 | 4/1981 | Putney | 192/56 R |
| 4,599,019 | 7/1986 | Ueberall | |
| 4,694,944 | 9/1987 | Schmidt | 192/56 R |
| 4,744,447 | 5/1988 | Kato et al. | 192/56 R |

FOREIGN PATENT DOCUMENTS 2511148 9/1976 Fed. Rep. of Germany .
324095 5/1970 Sweden .

Primary Examiner—Randolph A. Reese
Assistant Examiner—Peter M. Cuomo
Attorney, Agent, or Firm—Edwin T. Bean, Jr.; Martin G. Linihan; John C. Thompson

[57] ABSTRACT

A settable slip clutch or coupling between a driving (1) and a driven (2) shaft includes balls (11) accommodated in recesses (3) on the driving shaft and in engagement with chambers (18) in the driven shaft. To achieve an unloading effect when the clutch slips, i.e. when the balls are urged from the recesses and into the chambers, thus disengaging the clutch, at least one of the chambers, e.g. (17) and/or (16) is made with a width which is at least 1.5 times as great as the ball diameter. For obtaining a reverse lock when rotation is reversed, this and/or those chambers can be made with a wall plane (7, 8) which is inclined (α) relative to the normal wall plane direction. Alternatively, a further chamber (15) may have an opening (12) in its one wall to serve as reverse lock.

7 Claims, 1 Drawing Sheet

SETTABLE SLIP CLUTCH

The present invention relates to a settable slip clutch or coupling between a driving and a driven shaft, where the clutch has a plurality of torque transmitting balls arranged in a corresponding number of recesses in the driving shaft. The recesses are connected by a groove made in the surface of the driving shaft. The groove is shallower than the recesses, which have a radius corresponding to that of the balls. Each ball thrusts into its individual chamber made in the driven shaft. In normal operatior the balls are kept urged into the recesses by spring bias, which is adjustable such as to obtain the desired value of the torque at which the driving shaft shall slip, i.e. disengage from the driven shaft. Accordingly, when the driving torque exceeds the set value and the clutch is to slip, the balls are urged out of the recesses and into the chambers, engagement between the shafts then ceasing.

BACKGROUND ART

In the settable slip clutches of the prior art, e.g. according to the Swedish patent application 8602529-3, it has been found that there is a hammering friction torque, due to the balls returning to their inactive positions each time the recesses in the driving shaft and the chambers in the driven shaft come opposite each other. During rotation the balls will then engage against the chamber walls as well as the surface of the recesses. The appreciable frictional torque results in large heat generation in the clutch and heavy wear on the balls.

Another disadvantage of this kind of clutch in the prior art is that it slips unintentionally when the rotational direction is reversed, due to the torque which then occurs exceeding the value set with the aid of the spring bias.

DISCLOSURE OF THE INVENTION

With the settable slip clutch or coupling in accordance with the invention the abovementioned problems are surmounted by giving at least one of the chambers an increased width, and by forming at least one o them with a reverse lock. The expanded chamber has the effect that its associated ball will move sideways when the clutch is about to slip. The spaced relationships of the balls and the recesses will thus not coincide, with the result that the means providing spring bias, which the balls overcome when the clutch slips, cannot urge the balls into their inactive positions in the recesses. The friction in the clutch thus decreases, and consists solely of the frictional torque between the balls and the groove made in the cylindrical surface of the driving shaft, with a consequential lowering of heat generation and wear in the clutch.

In reversing the driving direction, the balls are returned to their normal operational position, so that the means providing spring bias can urge the balls towards the recesses for the continued normal operation of the clutch. In order to avoid the clutch disengaging unintentionally on reversed rotation, at least one of the chambers is arranged with a reverse lock.

The reverse lock can be implemented different ways, but it is preferably such that wall plane of the chamber forms an angle to the direction of the normal wall plane, this direction being parallel to a radius drawn through the centre of rotation of the shafts and the centre of the ball in question, so that an imagined line between both points of contact of the ball with the driving and driven shafts extends through or outside the centre of the ball, as seen from the axis common to the shafts. Alternatively the reverse lock may be an opening in the chamber wall facing in the reverse direction.

PREFERRED EMBODIMENTS

The clutch or coupling in accordance with the invention will now be described in detail with reference to the accompanying drawing, which illustrates different preferred embodiments of the clutch used in connection with a tap holder of the kind described in the abovementioned patent application. The inventive clutch or coupling is not to be regarded as restricted to these embodiments, nor to the exemplifying tap holder, and it is applicable wherever such clutches or couplings can be used. On the drawing, FIG. 1 is a diametral section through a clutch or coupling in accordance with the invention, illustrating different configurations of the chambers on the driving shaft, FIG. 2 is a section along the line II—II in FIG. 1, and FIG. 3 illustrates a detail in connection with explaining one embodiment of the reverse lock.

Figure 2:
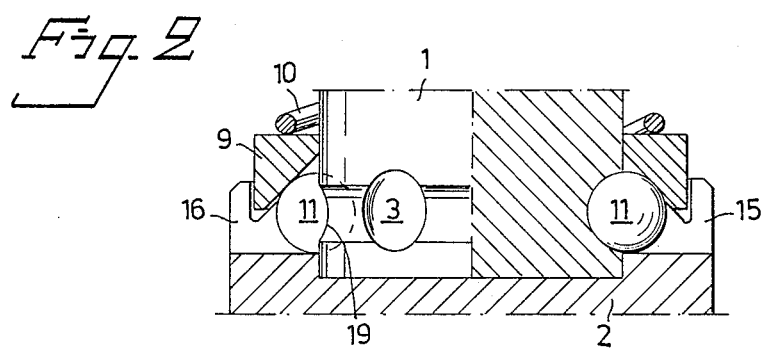
Figure 3:
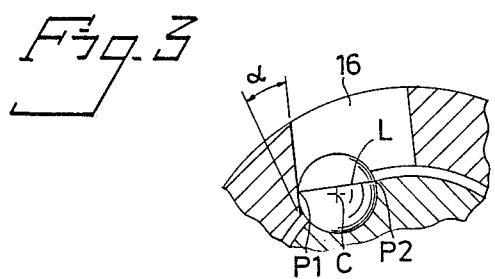

As will be seen from FIGS. 1 and 2, there is a driving shaft 1 and a driven shaft 2 (corresponding to the carrier or dog of the Swedish patent specification 8602529-3). A plurality of recesses 3 are made in the shaft 1, and these are joined together by a groove 19. In the normal operation of the clutch a ball 11 rests in each recess, thus forming the coupling to the driven shaft 2, which has chambers 18, into which the balls 11 thrust. The chambers 18 normally have a width B1 corresponding to the diameter D of the balls 11. The depth of the recesses 3 is suited to the spring bias of a spring 10 via a bolster ring 9 (FIG. 2). The bias is settable, e.g. as described in the mentioned patent application. When the driving torque in the driven shaft 2 exceeds the set spring bias the balls 11 are urged out of the recesses 3 into the position 4, the engagement between shafts 1 and 2 ceasing when the balls have completely left the recesses 3 and have been urged into the chambers 18. With the clutches or couplings of this kind in the prior art there are then the complications mentioned above.

To balance the clutch in accordance with the invention, at least one of the chambers, here denoted 17, has been made with a greater width B2 than the ball diameter D, where the width B2 should be at least equal to 1.5 D. When the clutch slips, i.e. when the n driving torque exceeds the set spring bias, the balls 11 will be urged into the chambers 17, 18, but the ball 11 associated with the chamber 17 will furthermore move to position 5 and stay there until reversal takes place. When the ball assumes position 5, the bolster ring 9 is kept raised, and accordingly the remaining balls 11 are not urged into their respective recesses 3. There is thus obtained a driving torque in a disengaged state which is substantially lower than the disengaging torque occurring when slipping takes place (and which remained in clutches or couplings of the prior art, with the previously described problems as a result). The balls 11 come solely into contact with the groove 19.

In order to prevent unintentional slipping of the clutch when its rotational direction is reversed, at least one of the chambers 18 is provided a reverse lock. This can be achieved by the chamber wall plane 7, 8 being given an angled attitude, as illustrated for chamber 16 (in comparison with the wall plane of chamber 17). The wall plane 7, 8 of chamber 16 is thus inclined forwards in the normal rotational direction V, with an angle α to the normal wall plane direction, which is parallel to the radius through the centre of the ball associated with the chamber. The size of the angle α is here such that an imagined line L (FIG. 3) connecting both contact points P1, P1 of the ball with the driving shaft 1 and the driven shaft 2 extends through the centre C of the ball or lies outside this centre, seen from the common rotational axis R of the shafts 1, 2. The force component acting on the ball will therefore keep it in the recess 3 for reverse rotational direction.

An alternative embodiment of the reverse lock is illustrated in FIG. 1 in conjunction with the chamber 15. Here an opening 12 has been made in the wall of chamber 15, this opening being situated rearwards in the normal forward rotational direction according to the arrow V. The opening 12 has a shape suitable for accommodating the ball 11, which is the case when the rotational direction is reversed counter to the arrow V and the torque exceeds the set spring bias. The ball 11 accommodated by the opening 12 is retained in its recess 3 (the position 14 in FIG. 1) in spite of the slipping situation that has arisen by the wall surface of the opening 12 keeping the ball in this position.

As will be understood from the above, at least one of the chambers shall be wider than the ball diameter, and at least one of them shall have a reverse lock. Both these facilities may be arranged together at one chamber, e.g. chamber 16. Even so, it is most advantageous to form two diametrically opposite chambers with the greater width, so that also uniform loading is obtained on the driven shaft for the case where it slips. One or both of these chambers can also have an inclined wall plane, or the reverse lock can be arranged in the form of an opening in a third chamber.

Further embodiments are of course conceivable within the scope of the invention, and these may be such as providing the clutch with three chambers of the greater width at 120° spacing. One or more of these can be formed with the inclined wall plane, or a fourth chamber can have the reverse lock in the form of the opening described above. When the clutch is to have its operational, rotational direction counter to the arrow V according to FIG. 1, the inclined wall plane or the openings of the chambers are executed to opposite hand.

We claim:

1. A settable slip clutch or coupling between a driving shaft (1) having a cylindrical surface and a driven shaft (2) to which torque is applied, particularly for tap holders, and including a plurality of engagement balls (11) of a given number and disposed in recesses (3) corresponding to the number of balls, each of said balls having a center, a radius and a diameter (D), the recesses being made in the driving shaft and connected by a groove (19) made in the cylindrical surface of the driving shaft and shallower than the recesses, which have a radius corresponding to the radius of the balls, and where the balls (11) thrust into a plurality of chambers (15–18) defined in the driven shaft and having spaced-apart walls and having a number corresponding to the number of balls (11), which in normal operation are kept urged into the recesses (3) by spring bias, which is settable to a desired value of the torque at which the driving shaft shall be disengaged from the driven shaft, characterized in that at least half the number of said chambers (15–18) have a width being mainly restricted to the diameter (D) of the ball (11) belonging thereto and the walls of each one of these chambers are parallel to each other and to a radius drawn through a center of the chamber and through the central axis (R) of said driving and driven shafts (1,2) while at least one (16,17) of the chambers (15–18) in the driven shaft (2) has an increased width (B2) which is greater than the diameter (D) of its associated ball (11) so that said chambers have different shapes determined by the widths thereof and in that a reverse lock is formed by at least one of the walls (7,8; 12,15) of the chambers (16,17; 15,18).

2. Clutch or coupling as claimed in claim 1, characterized in that two diametrically opposed chambers (16, 17) have said increased width (B2).

3. Clutch or coupling as claimed in claim 1, characterized in that chambers at 120° spacing have said increased width (B2).

4. Clutch or coupling as claimed in claim 1, wherein said driving and driven shafts (1,2) have a central axis (r) and wherein said driving shaft (1) has a normal operational direction of rotation, and characterized in that the reverse lock is made by each wall (7,8) defining a corresponding wall plane forming an angle ( ) to a radius drawn through said central axis (R) and the centre of the ball (11) associated with the chamber, whereby an imagined line (L) joining both contact points (P1,P2) of the ball (11) with the driving shaft (1) and the driven shaft (2) at the normal operational direction of rotation of said driving shaft (1) extends through the centre (c) of the ball, seen from the said central axis (R).

5. Clutch or coupling as claimed in claim 1, wherein said driving shaft (1) has a normal operational direction of rotation and characterized in that the reverse lock is made by an opening (12) in the wall of the chamber (15) extending in a direction opposite to said normal operational direction of rotation.

6. Clutch or coupling as claimed in claim 1, wherein said reverse lock is formed by the walls (7,8) of at least one of the chambers (16,17) having the increased width (B2).

7. Clutch or coupling as claimed in claim 1, wherein said reverse lock is formed by the wall of one of the chambers (15, 18) having a restricted width.

* * * * *